Feb. 28, 1956  H. B. REX  2,736,869
MECHANICO-ELECTRICAL CONVERTER
Filed Aug. 20, 1952  3 Sheets-Sheet 1

INVENTOR
HAROLD B. REX

BY
ATTORNEYS

Feb. 28, 1956 H. B. REX 2,736,869
MECHANICO-ELECTRICAL CONVERTER
Filed Aug. 20, 1952 3 Sheets-Sheet 2

INVENTOR
HAROLD B. REX

BY
ATTORNEYS

Feb. 28, 1956  H. B. REX  2,736,869
MECHANICO-ELECTRICAL CONVERTER
Filed Aug. 20, 1952  3 Sheets-Sheet 3

INVENTOR
HAROLD B. REX

BY
ATTORNEYS

United States Patent Office 2,736,869
Patented Feb. 28, 1956

2,736,869

MECHANICO-ELECTRICAL CONVERTER

Harold B. Rex, Falls Church, Va.

Application August 20, 1952, Serial No. 305,521

3 Claims. (Cl. 336—30)

(Granted under Title 35, U. S. Code (1952), sec. 266)

The invention described herein may be manufactured and used by or for the Government of the United States of America for governmental purposes without the payment of any royalties thereon or therefor.

This invention relates to a deflection sensitive electrical gage, and more particularly to a magnetic type pickup or gage for converting a small mechanical displacement to a large electrical signal.

It has heretofore been customary in devising magnetic gages for sensing or measuring a mechanical deflection, to employ electrical components such as iron core inductors and transformers having a mechanical means sensitive to the measured quantity for varying the core air gap, or otherwise varying the magnetic circuit components, to thereby provide a change in electrical value proportional thereto. However, although these prior art devices have proved satisfactory in many applications, their electrical variation with mechanical deflection is limited, and as a result must oftentimes be further enhanced by means of amplifiers. Further, insofar as the electrical output of these prior gages is dependent upon the position of one or more of its parts, many of these pickups are subject to drift and variation of sensitivity if not properly adjusted and maintained in alignment.

The present device is directed toward overcoming these limitations prevalent in the prior art magnetic gages by providing a magnetic type gage whose variation of electrical value with mechanical deflection is sufficiently great to eliminate the need for amplifiers. Further by virtue of its construction, it is not subject to the common gage failings such as variation of null point, variation of sensitivity with the magnitude of the measured quantity, and narrow range of response, and therefore may be successfully employed over a wide range without requiring extensive adjustment and maintenance. These improved features are supplied by providing a novel gage structure comprised of an inductance having a saturable core in conjunction with an independent generating means for increasing or decreasing the core saturation in accordance with the measured quantity, thereby increasing or decreasing the impedance presented by the inductor to the flow of current therethrough. This increased or decreased core saturation is obtained by exerting an additional magnetomotive force on the core while maintaining the core air gap substantially constant as may be more fully comprehended hereinafter.

It is accordingly one object of this invention to provide a magnetic pickup having a large change in electrical output with a small mechanical deflection.

A further object of this invention is to provide a magnetic pickup whose electrical output is proportional to the mechanical deflection independently of line voltage fluctuations, or of the absolute magnitude of the measured quantity.

A further object of this invention is to provide an amplifying magnetic pickup having but two electrical terminals and a deflection sensitive element, and incorporating means for enabling either self-regeneration, self-degeneration, ferro resonance, or pulsed feedback of the pickup whereby its response may be selected for enabling its application for a wide variety of uses.

Other objects and many of the attendant advantages of this invention will be readily appreciated as the same becomes better understood by reference to the following detailed description when considered in connection with the accompanying drawings wherein.

Figure 1:
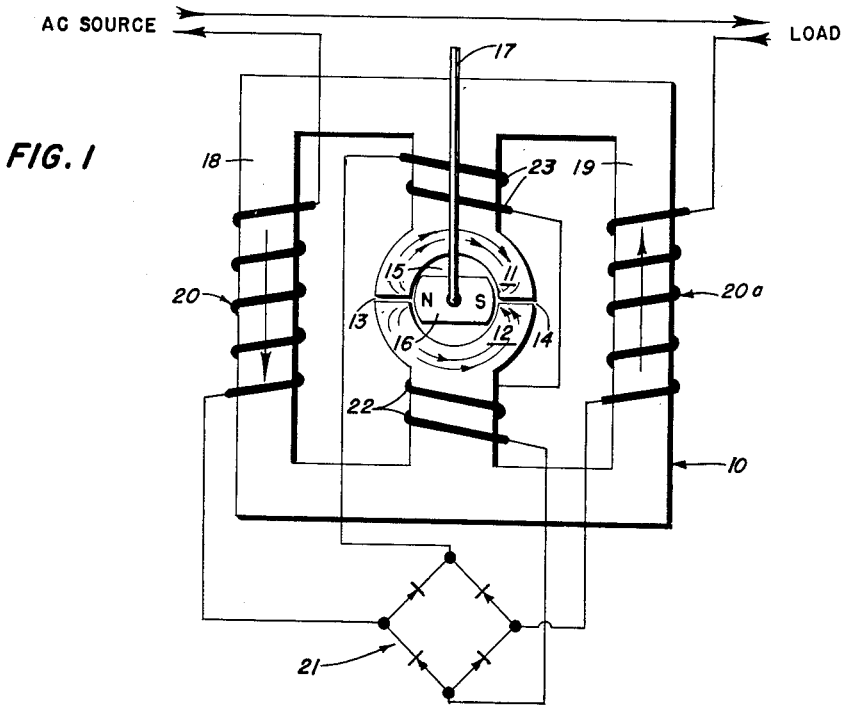
Fig. 1 is a plan view of a simplified magnetic pickup embodying one concept of the invention.

Referring now to Fig. 1 for a detailed consideration of a magnetic pickup constituting one embodiment of the present invention, a three legged reactor core 10 of saturable magnetic material is provided having its center leg including two confronting semi-circular rings 11 and 12 separated by air gaps 13 and 14. Within the circular space 15 defined by the confronting ring sections is rotatably positioned a magnet 16 such as the bar magnet shown, whose length is slightly less than the inside diameter of the ring sections. Magnet 16, which may be of the permanent type, is fixedly secured to a deflection lever 17 diagrammatically illustrated as a straight shaft, whereby movement thereof operates to rotate magnet 16 within this circular space 15. About the two outer legs 18 and 19 of core 10 are wound portions of coils 20 and 20a which are connected in series between an energizing source of alternating potential and a suitable load (not shown) preferably comprising a meter or control system.

Considering the magnetic circuit for enabling a thorough understanding of the pickup operation; when magnet 16 is horizontally positioned (as shown) with its opposite poles symmetrically disposed adjacent the core air gaps 13 and 14, the flux flow generated thereby passes from the magnet north pole equally in parallel paths through the upper and lower ring sections of the core center leg to the magnet south pole, as illustrated by the arrowed lines shown, and therefore as is readily comprehended this flux is substantially confined to these semi-circular ring portions thereby unaffecting the flux in the core outer legs 18 and 19. However, should the deflecting lever 17 be positioned to rotate permanent magnet 16 from this null position to a position wherein its poles are not equally disposed adjacent air gaps 13 and 14, portions of the flux generated thereby are diverted from the magnet north pole through the upper or lower portions of the core center leg, depending upon the position of the magnet, in parallel paths through the core outer legs 18 and 19, and thence returning to the magnet south pole through the opposite portion of the core center leg. Considering the symmetry of the core it may be readily comprehended that the amount of flux diverted through the core outer legs 18 and 19 from the magnet is dependent upon the deflection of the permanent bar magnet 16 from its null position, and therefore varies from minimum to maximum as the bar magnet is rotated through 90° from the horizontal position shown, to a vertical position parallel to the core legs 18 and 19. As the core dimensions and material are selected to be readily saturable, the selfinductance of coils 20 and 20a is rapidly decreased as permanent magnet 16 is deflected from this null position, thereby rapidly diminishing the impedance presented by coils 20 and 20a to the flow of current from the alternating current source to the load.

Thus, in summary, the pickup operates to magnetically amplify a small mechanical deflection into a large change in electrical inductance by generating an independent saturating flux through a saturable core inductance; the saturating flux having a value which is dependent upon the mechanical deflection.

As a direct consequence of the self-amplifying feature inherent in this proposed gage, many refinements may be added to enhance its wide range of applicability. For example regenerative or degenerative feedback, may be readily supplied by feeding back the output current passing through coils 20 and 20a in such direction as to oppose or aid the core saturation brought about by magnet 16. Such an arrangement is illustrated in Fig. 1, wherein the alternating current passing through output coils 20 and 20a is converted to direct current by four rectifiers, generally designated 21, in a full wave bridge configuration, and this direct current output is thereafter conveyed to the series connected coils 22 and 23 wound about the core center leg. By means of such a feedback arrangement, compensation for fluctuation in the source potential may be made in conjunction with the elimination of distortion, thereby enabling the gage to maintain an output value directly proportional to the mechanical deflection. Other such circuit arrangements applicable to amplifiers and transductors including pulsed feedback and ferro resonance may also be embodied in the instant gage should the characteristics produced thereby be desired, as may now be readily comprehended by those skilled in the art to which this device pertains.

Figure 2:
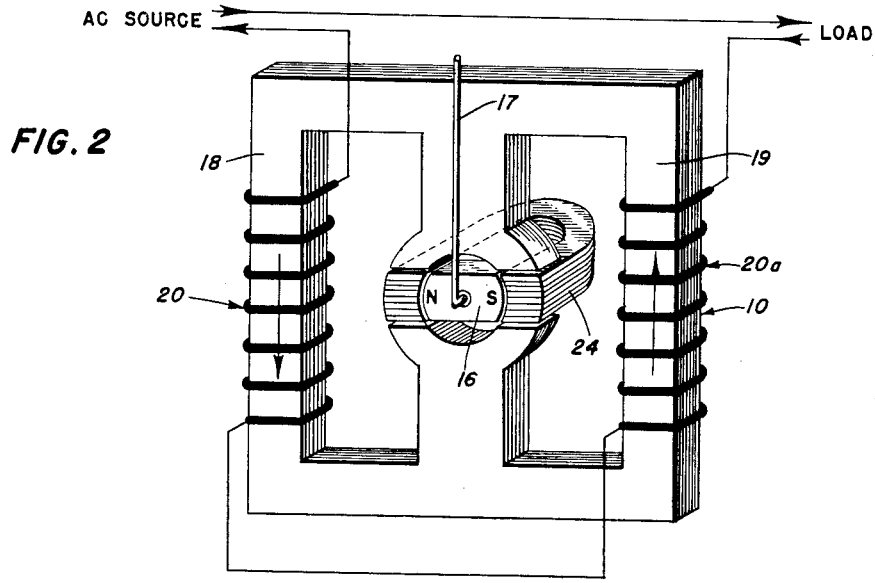
Fig. 2 is an isometric view of a simplified magnetic pickup embodying a second concept of the invention.

Fig. 2 is an isometric view of a second embodiment of the present invention possessing the twofold advantage of enabling greater change of amplification about the gage null point position (shown), and in addition preventing the magnetomotive force of magnet 16 from varying in magnitude. This is achieved by modifying the core center leg ring portions to enable the insertion therebetween of opposite ends of a U-shaped member 24 of nonsaturable permeable material. U-shaped member 24, by virtue of its relative nonsaturability furnishes a low reluctance flux path for the magnetomotive force supplied by permanent magnet 16 thereby in effect disabling magnet 16 from energizing core 10 while in the null position shown, while providing a sharp change in the core flux density when deflected therefrom.

Figure 3:
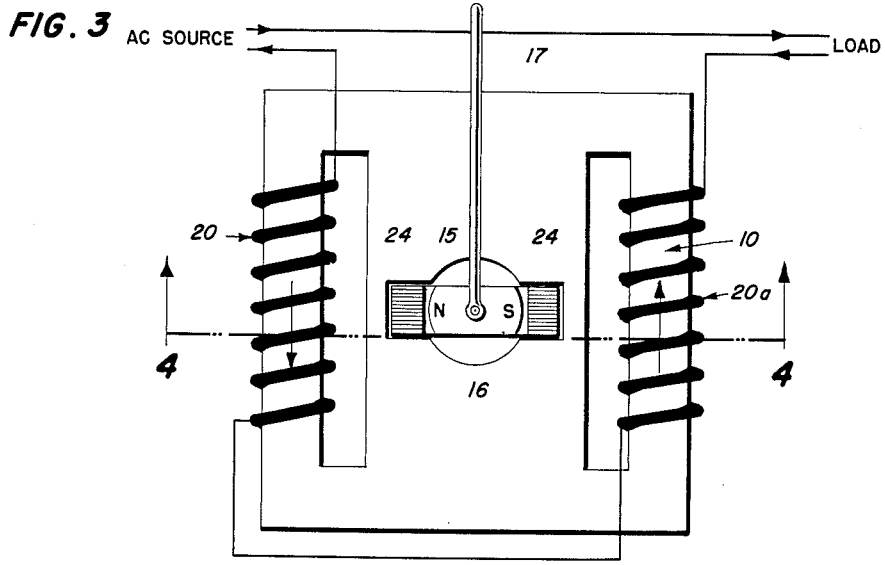
Fig. 3 is a plan view of a modified form of the pickup of Fig. 2.
Figure 4:
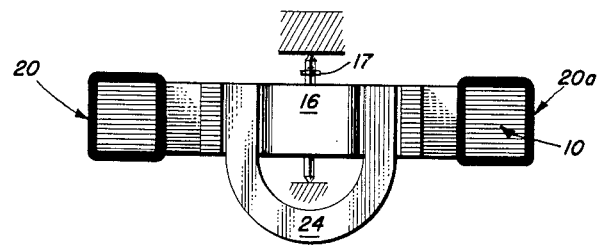
Fig. 4 is a cross sectional view through line 4—4 of Fig. 3.

Fig. 3 and Fig. 4 constitute a plan view and cross sectional view of a further modified embodiment of the present invention similar to Fig. 2 in operation, but having a dissimilar core structure therefrom; wherein the magnetic path through the center leg is continuous and unbroken by air gaps.

Figure 5:
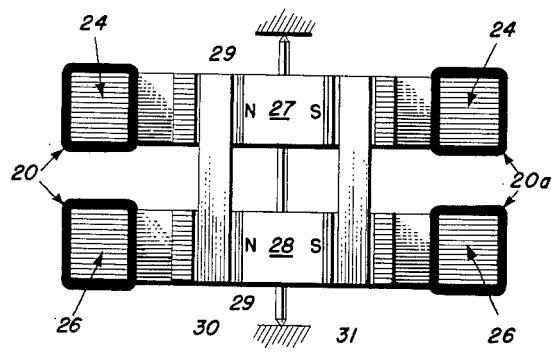
Fig. 5 is a cross sectional view similar to Fig. 4 comprising a modified form of the pickup of Fig. 3.

Fig. 5 is a cross sectional view similar to Fig. 4, and including two such units interconnected in astatic arrangement wherein two identical core members 24 and 26 are positioned in overlying relation and saturated in opposition by the deflection of two magnets 27 and 28 rotatively mounted in opposition on a common shaft 29. By virtue of this astatic arrangement two bars 30 and 31 of nonsaturable, magnetically permeable material, may be employed as common return paths for both magnets when in their null position to enable a greater change of amplification about the null point and prevent magnets 27 and 28 from varying in strength as discussed above in conjunction with Figs. 2, 3, and 4.

In each of the above embodiments of the present invention, the inductance of coils 20 and 20a and therefore the impedance presented by these coils to the flow of current therethrough is maximum at the null position of magnet 16 and decreases with deflection of the magnet from this null position. However, it is oftentimes desirable in measuring quantities to provide a gage having a zero output with no deflection and a uniformly increasing electrical output as the deflection is increased. Such a gage may be readily obtained by means of the present invention by replacing the two series connected inductance coils 20 and 20a, wound about the core outer legs 18 and 19, with four equal coils 32, 33, 34 and 35, such as illustrated by Fig. 6, and thereafter electrically connecting these four coils in a Wheatstone bridge circuit, such as illustrated by Fig. 7.

Figure 6:
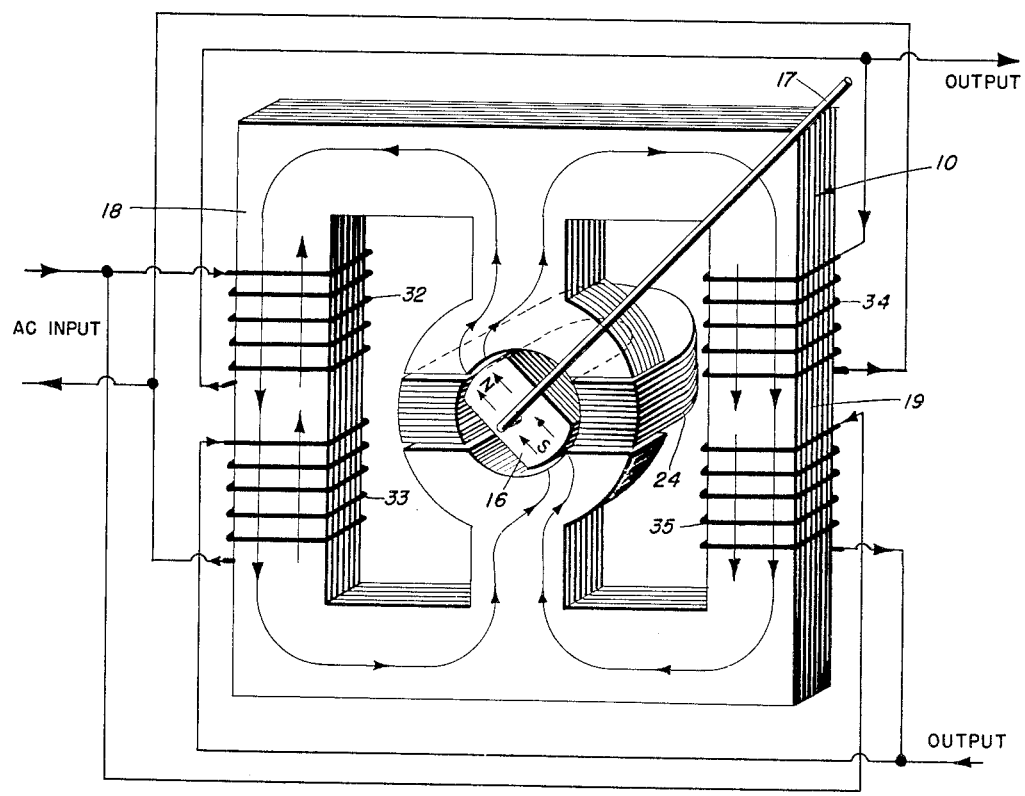
Fig. 6 is an isometric view similar to Fig. 2 having the inductance coils in a bridge arrangement.
Figure 7:
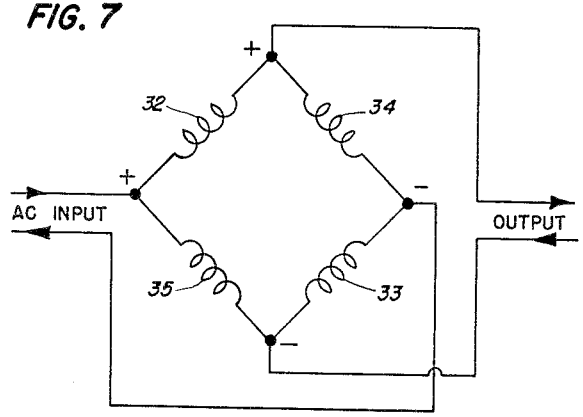
Fig. 7 is a schematic diagram illustrating the electrical circuit connection of Fig. 6.

Referring to Figs. 6 and 7, for enabling an understanding of one manner of winding these four coils on the core outer legs 18 and 19 and electrically interconnecting the same to provide a gage having a zero current output at null; upper coil 32 on the core left leg 18 and upper coil 34 on the core right leg 19 are connected in series as the two upper arms of the Fig. 7 Wheatstone bridge, and lower coil 33 on the core left leg 18 and lower coil 35 on the core right leg 19 are connected in series as the two lower arms of the Fig. 7 Wheatstone bridge. Considering the current flow from the source during a given half cycle as represented by the arrows shown in Fig. 6, and applying the right hand screw rule, it may be observed that the direction of coil windings and direction of current flow therein tend to provide a flux moving in the upward direction in outer core leg 18 and a flux in the downward direction in outer core leg 19, as illustrated by the short arrowed lines. However, flux generated by magnet 16 through the center leg and illustrated by the continuous arrowed lines, flows in the same direction through both outer legs whereby for the selected illustration the magnetomotive forces exerted by the source and permanent magnet are in opposition within core left leg 18 and aiding within core right leg 19. Insofar as the core leg dimensions and material are readily saturable the core right leg 19 becomes more saturated and core left leg 18 less saturated whereby coils 34 and 35 wound about core right leg 19 have a lower inductance value than coils 32 and 33 wound about the less saturated core left leg 18, and as these later coils are electrically connected in diagonal arms of the Fig. 7 bridge, a bridge unbalance occurs.

During the second half cycle of the source alternating current the current flow direction reverses and therefore the magnetomotive force exerted by coils 32 and 33 is downward, and by coils 34 and 35 is upward. Insofar as the direction of flux flow from magnet 16 remains constant for any given deflection, the core left leg 18 now becomes more saturated and the core right leg 19 less saturated whereby the inductance of coils 34 and 35 increase and that of coils 32 and 33 decrease producing a bridge unbalance 180 electrical degrees out of phase with that of the first half cycle of the source alternating current. Thus the constant flow of saturating flux from magnet 16 in the same direction through the core center leg and outer legs produces an alternating current bridge unbalance which in the absence of such flux would not be present. Similarly the magnitude of saturating flux traveling through the core center leg controls the differential variation in coil inductance value by controlling the degree of saturation present in the core outer legs, thereby controlling the degree of bridge unbalance and electrical gage output.

Although the various features of the present invention have been separately illustrated and described, it is believed apparent to one skilled in the art that these features may be added in various combinations dependent upon the conditions of measurement and the results desired. Further, insofar as the drawings are merely simplified illustrations of actual embodiments for aiding in the comprehension of the invention, it is contemplated that various refinements in these features be within the spirit of the invention, such as employing an electromagnet for the permanent magnet 16 shown, where it is desired to render the load current additionally dependent upon the magnet strength; and utilizing a pick-up arm having a mechanical advantage, instead of the simplified lever 17, where it is desired to provide greater sensitivity over a narrower range.

Obviously many modifications and variations of the present invention are possible in the light of the above teachings. It is therefore to be understood that within the scope of the appended claims the invention may be practiced otherwise than as specifically described.

What is claimed is:

1. A high gain pickup having a sharply defined null position including: a saturable core, a magnet movably positioned proximate the core for generating a magnetic flux therethrough whose density is related to the position of the magnet, a nonsaturable permeable member supported proximate the core and magnet and providing a magnetic shunt for the magnet in the null position, a coil wound about portions of the core, and means responsive to a measurable condition for changing the position of the magnet and diverting it from the shunted null position, thereby rapidly varying the saturation of the core and the inductance of the coil.

2. A mechanico-electrical converter comprising: a saturable core having a plurality of legs, a bar magnet movably positioned in electrical apposition to one leg for producing a flux therein whose density is related to the relative position of core leg and magnet, a nonsaturable permeable member of U-shaped configuration supported proximate to the core and magnet, and in a plane perpendicular thereto, for providing a magnetic shunt for the magnet in a given position thereof, a coil wound about portions of the core, and means responsive to a measurable condition for changing the position of the magnet and diverting it from the shunted null position, thereby rapidly varying the core saturation and the coil inductance in accordance therewith.

3. A high gain pickup comprising a saturable core having a coil coupled thereto, a magnet movable relative to said core so that the flux through the core will be increased and will be proportional to the deflection of the magnet from a null position, and a nonsaturable permeable member placed next to the ends of the magnet so that a low reluctance flux path is furnished thereby, preventing the core from being energized by the magnet in the null position and causing the core flux to vary sharply in response to a relatively slight shift in the position of said magnet, thereby causing the impedance of the coil to follow the highly transient character of said core flux.

References Cited in the file of this patent

UNITED STATES PATENTS

| | | |
|---|---|---|
| 2,053,154 | Pierre | Sept. 1, 1936 |
| 2,380,242 | Jewell | July 10, 1945 |
| 2,395,881 | Klemperer | Mar. 5, 1946 |
| 2,419,573 | Lawlor | Apr. 29, 1947 |
| 2,475,200 | Roys | July 5, 1949 |

FOREIGN PATENTS

| | | |
|---|---|---|
| 874,663 | France | Aug. 18, 1942 |